(12) United States Patent
Won et al.

(10) Patent No.: US 6,646,409 B2
(45) Date of Patent: Nov. 11, 2003

(54) APPARATUS FOR CONTROLLING ROTATION SPEED OF MOTOR

(75) Inventors: June Hee Won, Seoul (KR); Dal Ho Cheong, Seoul (KR); Jae Yoon Oh, Seoul (KR); Kyung Hoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/038,659

(22) Filed: Jan. 8, 2002

(65) Prior Publication Data

US 2003/0025475 A1 Feb. 6, 2003

(30) Foreign Application Priority Data

Jun. 20, 2001 (KR) ........................................ 2001-35034

(51) Int. Cl.[7] .................................................. H02P 5/40
(52) U.S. Cl. ...................... 318/701; 317/714; 317/715; 317/719; 317/721; 317/606; 317/609
(58) Field of Search ................................ 318/701, 714, 318/715, 719, 721, 606, 609

(56) References Cited

U.S. PATENT DOCUMENTS 5,541,488 A * 7/1996 Bansal et al. ............... 318/801
5,821,727 A    10/1998 Yura .......................... 318/809
6,264,005 B1 * 7/2001 Kang et al. .................. 187/290
6,359,415 B1 * 3/2002 Suzuki et al. ............... 318/727
6,414,462 B2 * 7/2002 Chong ......................... 318/701

* cited by examiner

Primary Examiner—Rita Leykin
(74) Attorney, Agent, or Firm—Fleshner & Kim, LLP

(57) ABSTRACT

An apparatus for controlling the rotation speed of a motor, which is capable of controlling the rotation speed and the torque of the motor by detecting the input voltage and the input current of the motor without using a sensor for detecting the position of the rotor of the motor, is provided. The apparatus for controlling the rotation speed of a motor includes a synchronous/stationary coordinate converter for comparing the reference speed of a motor with the estimated speed of the motor and outputting reference magnetic flux component current and reference torque component current for compensating for an error value according to the comparison result as the reference voltage of an $\alpha$ axis and the reference voltage of a $\beta$ axis in a stationary coordinate system, a two phase current generator for receiving three phase current detected when the motor rotates and outputting magnetic flux component current and torque component current, a speed/position estimation operator for estimating the position and the rotation speed of a rotor in the motor on the basis of the reference of the $\alpha$ axis, the reference voltage of the $\beta$ axis, the current of the $\alpha$ axis, the current of the $\beta$ axis, and reference speed and controlling the rotation speed and the torque of the motor.

22 Claims, 4 Drawing Sheets

APPARATUS FOR CONTROLLING ROTATION SPEED OF MOTOR

BACKGROUND OF THE INVENTION

1. Field of the Invention

The present invention relates to an apparatus for controlling the rotation speed of a motor, and more particularly, to an apparatus for controlling the rotation speed of a motor, which is capable of detecting the voltage and the current that are applied to the motor and controlling the rotation speed and torque.

2. Description of the Background Art

In general, information on the speed of the motor or flux information is essential to controlling instantaneous torque in an apparatus for controlling the speed of a motor, in particular, a synchronous reluctance motor (SYNRM). That is, a sensor of information on the rotation speed of the motor and a flux sensor such as a hall sensor, a resolver, and a pulse encoder are necessary. However, it is difficult to install the sensors and the sensors are sensitive to installation conditions. Therefore, the sensors are vulnerable to noise. Also, the sensors are expensive. According to a method for controlling a vector without a speed sensor, speed and torque are controlled without correcting speed errors with respect to change in the rotor resistance of the motor.

FIG. 1 shows the respective axes of a common SYNRM.

As shown in FIG. 1, in the stator side three-phase axes (U, V, and W axes), a phase difference between the U axis and the V axis is 120°. The phase difference between the V axis and the W axis is 120°. The phase difference between the W axis and the U axis is 120°. The $\alpha$ axis and the $\beta$ axis are in a stationary coordinate system. The d axis and the q axis are synchronous axes. Also, the flux axis $\theta_e$ of a rotor is an angle showing the phase difference between the U axis and the d axis. The conventional technology will now be described with reference to FIG. 2.

FIG. 2 is a block diagram showing the structure of the apparatus for controlling the rotation speed of the SYNRM according to the conventional technology.

As shown in FIG. 2, the apparatus for controlling the rotation speed of the SYNRM according to the conventional technology includes a first proportional integration (PI) controller 12 for receiving an error value obtained by comparing reference speed $w^*_m$ with estimated speed $w^*_m$ and outputting reference torque component current $i^*_q$ for compensating for the error value, a second PI controller 15 for receiving an error value obtained by comparing reference magnetic flux component current $i^*_d$ with real magnetic flux component current $i^*_d$ and outputting the reference magnetic flux component current for compensating for the error value as a reference magnetic flux component voltage $v^*_d$, a third PI controller 16 for receiving an error value obtained by comparing the reference torque component current $i^*_q$ with real torque component current $i^*_q$ and outputting the reference torque component current for compensating for the error value as a reference torque component voltage $v^*_q$, a synchronous/stationary coordinate converter 17 for changing the reference magnetic flux component voltage $v^*_d$ and the reference torque component voltage $v^*_q$ from a synchronous coordinate system to a stationary coordinate system according to sine and cosine values sin $\theta$ and cos $\theta$ of the real magnetic flux angle $\theta$ and outputting the reference voltages $v^*_\alpha$ and $v^*_\beta$ in the stationary coordinate system, a three phase voltage generator 18 for converting the reference voltage $v^*_\alpha$ and $v^*_\beta$ in the stationary coordinate system into three phase voltages $v_{as}$, $v_{bs}$, and $v_{cs}$ and outputting the three phase voltages $v_{as}$, $v_{bs}$, and $v_{cs}$, an inverter 19 for applying the three phase voltages $v_{as}$, $v_{bs}$, and $v_{cs}$ generated by the three phase voltage generator 18 to the SYNRM, a rotor position detector 22 for detecting the position of the rotor of the SYNRM, a speed operator 24 for outputting the estimated speed $w_m$ from the position of the detected rotor, a signal generator 23 for generating the sine and cosine values sin $\theta$ and cos $\theta$ of the real magnetic flux angle $\theta$ from the position of the detected rotor and outputting the sine and cosine values sin $\theta$ and cos $\theta$, a two phase current generator 20 for converting the three phase current detected when the SYNRM rotates into two phase current $i_\alpha$ and $i_\beta$ and outputting the two phase current $i_\alpha$ and $i_\beta$ and a stationary/synchronous coordinate converter 21 for converting the two phase current $i_\alpha$ and $i_\beta$ into the stationary coordinate system and outputting the real torque component current $i_q$ and the real magnetic flux component current $i_d$. The operation of the apparatus for controlling the rotation speed of the SYNRM according to the conventional technology will now be described.

A first subtracter 11 obtains the error value by comparing reference speed $w^*_e$ with the estimated speed $w_e$ detected by the rotor position detector 22 during the rotation of the SYNRM and outputs the error value to the first PI controller 12.

A second subtracter 14 compares the reference magnetic flux component current $i^*_d$ with the real magnetic flux component current $i_d$ output from the stationary/synchronous coordinate converter 21 and outputs the obtained error value to the second PI controller 15.

The second PI controller 15 outputs the reference magnetic flux component voltage $v^*_d$ of the reference magnetic flux component current $i^*_d$ for compensating for the error value obtained by the second subtracter 14 to the synchronous/stationary coordinate converter 17. At this time, a third subtracter 13 compares the reference torque component current $i^*_q$ output from the first PI controller 12 with the real torque component current $i_q$ output from the stationary/synchronous coordinate converter 21.

The third PI controller 16 outputs the reference torque component voltage $v^*_q$ of the reference torque component current $i^*_q$ for compensating for the error value obtained by the third subtracter 13 to the synchronous/stationary coordinate converter 17. At this time, the reference magnetic flux component voltage $v^*_d$ output from the second PI controller 15 is output to the synchronous/stationary coordinate converter 17.

The synchronous/stationary coordinate converter 17 receives the reference magnetic flux component voltage $v^*_d$, the reference torque component voltage $v^*_q$, and the sine and cosine values sin $\theta$ and cos $\theta$ of the real magnetic flux angle $\theta$ output from the signal generator 23, generates the reference voltages $v^*_\alpha$ and $v^*_\beta$ in the stationary coordinate system, and outputs the reference voltages $v^*_\alpha$ and $v^*_\beta$ in the stationary coordinate system to the three phase voltage generator 18.

The three phase voltage generator 18 converts the reference voltages $v^*_\alpha$ and $v^*_\beta$ in the stationary coordinate system into the three phase voltages $v_{as}$, $v_{bs}$, and $v_{cs}$ in the stationary coordinate system and outputs the three phase voltages $v_{as}$, $vb_{bs}$, and $v_{cs}$ in the stationary coordinate system to the inverter 19.

The inverter 19 applies the three phase voltages $v_{as}$, $v_{bs}$, and $v_{cs}$ output from the three phase voltage generator 18 to the SYNRM. At this time, the rotor position detector 22 for detecting the position of the rotor of the SYNRM outputs the estimated speed $w_m$ to the first subtracter 11 through the speed operator 24.

The two phase current generator 20 receives the three phase current detected during the rotation of the SYNRM, generates the current $i_\alpha$ and $i_\beta$ in the stationary coordinate system, and outputs the current $i_\alpha$ and $i_\beta$ in the stationary coordinate system to the stationary/synchronous coordinate converter 21.

FIG. 3 is a vector diagram showing the voltage of the d axis of the to SYNRM and the voltage of the q axis of the SYNRM in a steady state.

As shown in FIG. 3, the equations of the voltages of the SYNRM are expressed by the d axis and the q axis that are the synchronous axes.

$$v_d = R_s i_d + L_d \frac{di_d}{dt} - w_e L_q i_q \quad \text{[Equation 1]}$$

$$v_q = R_s i_q + L_q \frac{di_q}{dt} - w_e L_d i_d$$

wherein, $v_d$ and $v_q$ refer to the d axis component and the q axis component of the voltage, respectively. $i_d$ and $i_q$ refer to the d axis component and the q axis component of the current, respectively. $R_s$ refers to the stator side resistance of the SYNRM. $L_d$ and $L_q$ refer to the inductance of the d axis and the inductance of the q axis, respectively.

When the SYNRM is in the steady state, the current differential term of the Equation 1 becomes '0' and is expressed by Equation 2. Equation 3 can express a torque equation.

$$v_d = R_s i_d - w_e L_q i_q$$

$$v_q = R_s i_q + w_e L_d i_d \quad \text{[Equation 2]}$$

wherein, $w_e L_d = X_d$ and $w_e L_q = X_q$. $X_d$ and $X_q$ refer to the reactance of the d axis and the reactance of the q axis, respectively. Therefore, the Equation 3 that is the vector diagram can express the Equation 2. Also, the torque Equation is the Equation 3.

$$T_e = \frac{3}{2} \frac{P}{2} \left(\frac{L_d - L_q}{L_d L_q}\right) \left(\frac{V_s}{w_e}\right)^2 \frac{\sin 2\delta}{2} \quad \text{[Equation 3]}$$

wherein, $L_d$ and $L_q$ refer to the inductance of the d axis and the inductance of the q axis, respectively. $\delta$ refers to the phase difference between a phase voltage $V_s$ and the current of the q axis. P refers the number of poles of the rotor in the SYNRM.

Here, torque is inverse proportionate to $v_s/w_e$ and $\sin 2\delta$. Also, the torque is maximal when $\delta$ is at an angle of 45 degrees when $v_s/w_e$ is fixed. However, current in a transient state includes a higher harmonics component and a direct current (DC) offset voltage. Accordingly, the differential term of the current does not become '0'. Therefore, the speed and the position of the rotor of the SYNRM are detected in the state, where the higher harmonics component and the DC offset voltage are included.

However, in the apparatus for controlling the rotation speed of the SYNRM according to the conventional technology, the current detected by a torque ripple and switching dead time includes a fundamental wave and higher harmonics. Accordingly, the higher harmonics component is included in an induced voltage. As a result, a ripple occurs in the estimated and operated rotation speed. Therefore, it is not possible to precisely control the speed. The encoder and the hall sensor are used in the rotor position detector. It is difficult to install the encoder and the hall sensor.

SUMMARY OF THE INVENTION

Therefore, an object of the present invention is to provide an apparatus for controlling the rotation speed of a motor, which is capable of precisely controlling the rotation speed of the motor by removing a hall sensor and an encoder for estimating the speed and the position of a synchronous reluctance motor (SYNRM), to thus detect the speed and the position of the SYNRM in a place where the position of a rotor cannot be easily detected, such as the compressors of a refrigerator and an air conditioner and extracting only the induced voltage of a fundamental wave component, to thus estimate and to operate the rotation speed of the SYNRM.

To achieve these and other advantages and in accordance with the purpose of the present invention, as embodied and broadly described herein, there is provided an apparatus for controlling the rotation speed of a motor, comprising a synchronous/stationary coordinate converter for comparing the reference speed of a motor with the estimated speed of the motor and outputting reference magnetic flux component current and reference torque component current for compensating for an error value according to the comparison result as the reference voltage of an α axis and the reference voltage of a β axis in a stationary coordinate system, a two phase current generator for receiving three phase current detected when the motor rotates and outputting the current of the α axis and the current of the β axis, and a speed/position estimation operator for estimating the position and the rotation speed of a rotor in the motor on the basis of the reference of the α axis, the reference voltage of the β axis, the current of the α axis, the current of the β axis, and reference speed and controlling the rotation speed and the torque of the motor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
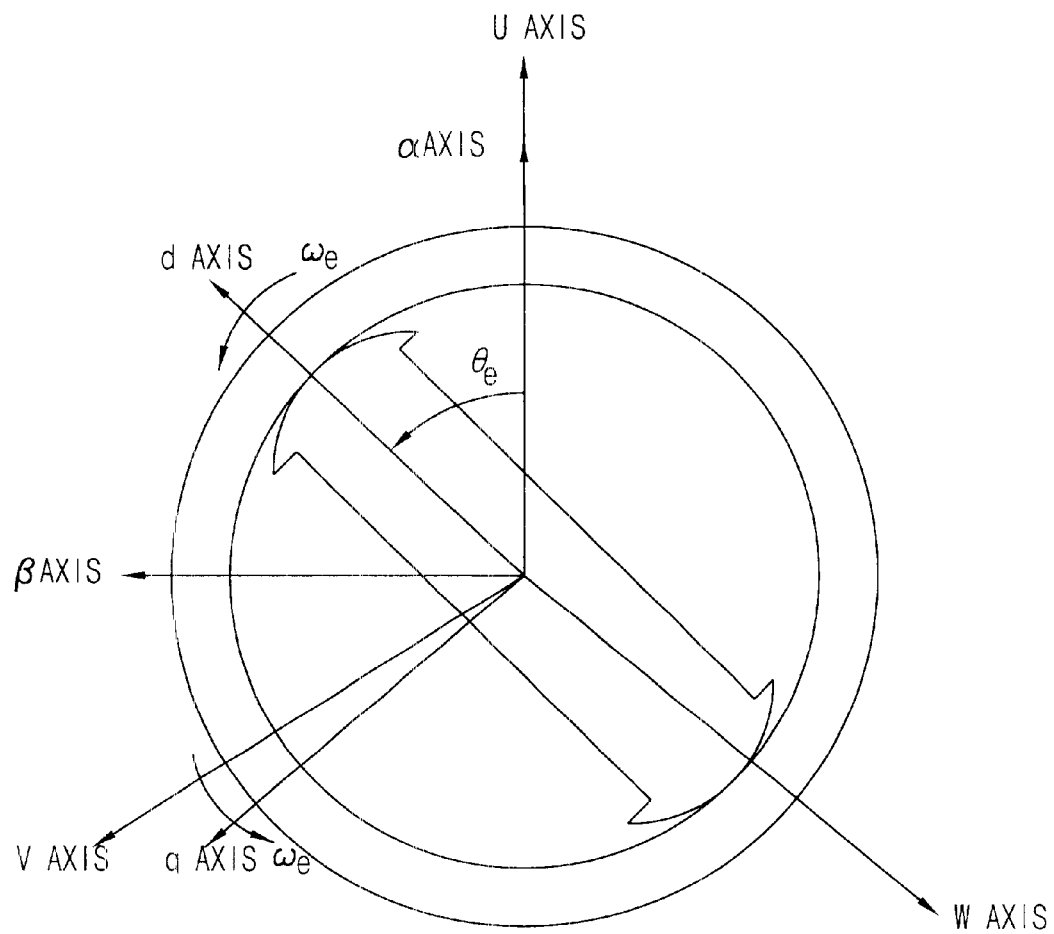
FIG. 1 shows the respective axes of a common synchronous reluctance motor (SYNRM)
Figure 2:
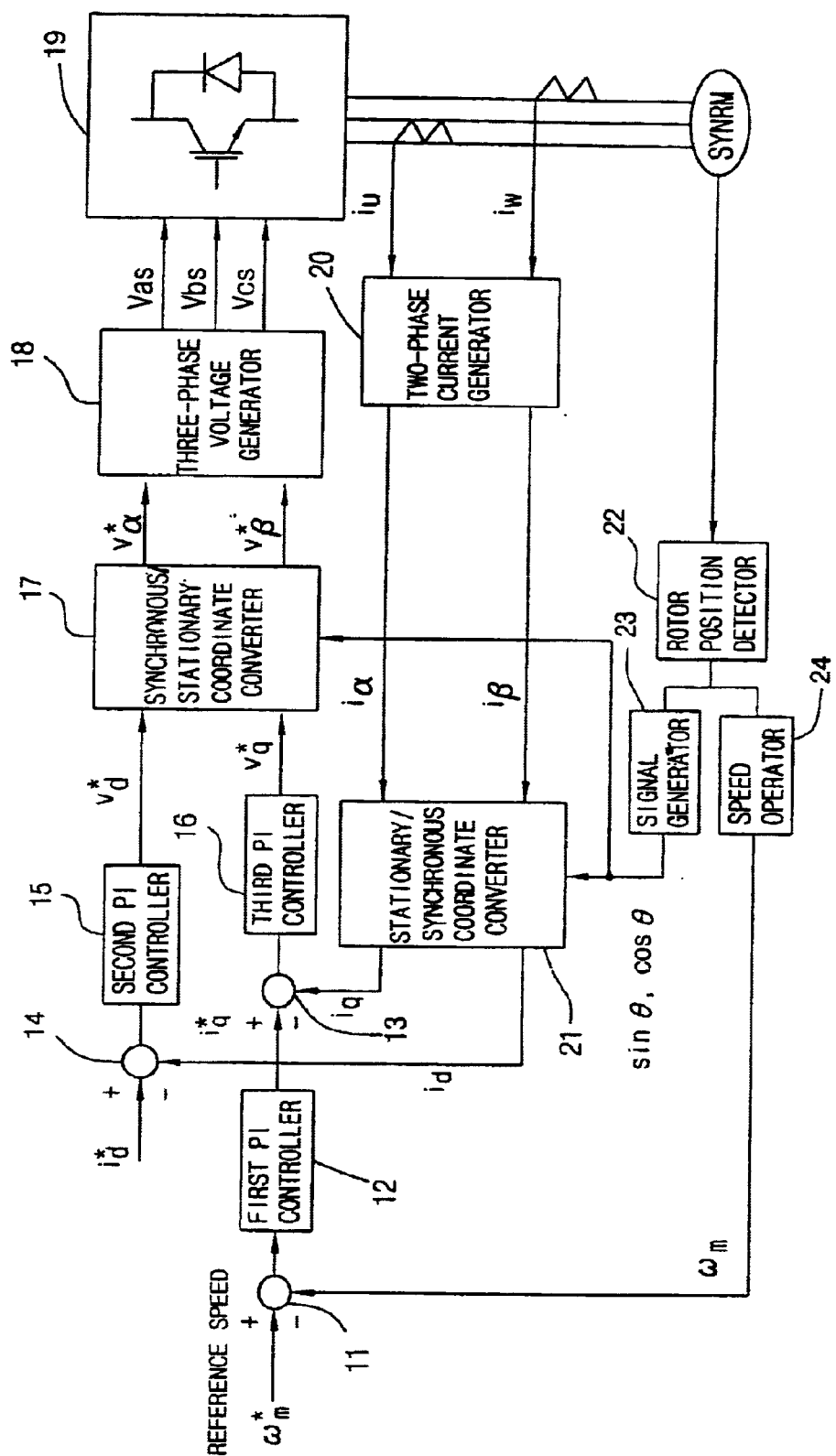
FIG. 2 is a block diagram showing the structure of an apparatus for controlling the rotation speed of a SYNRM according to a conventional art.
Figure 3:
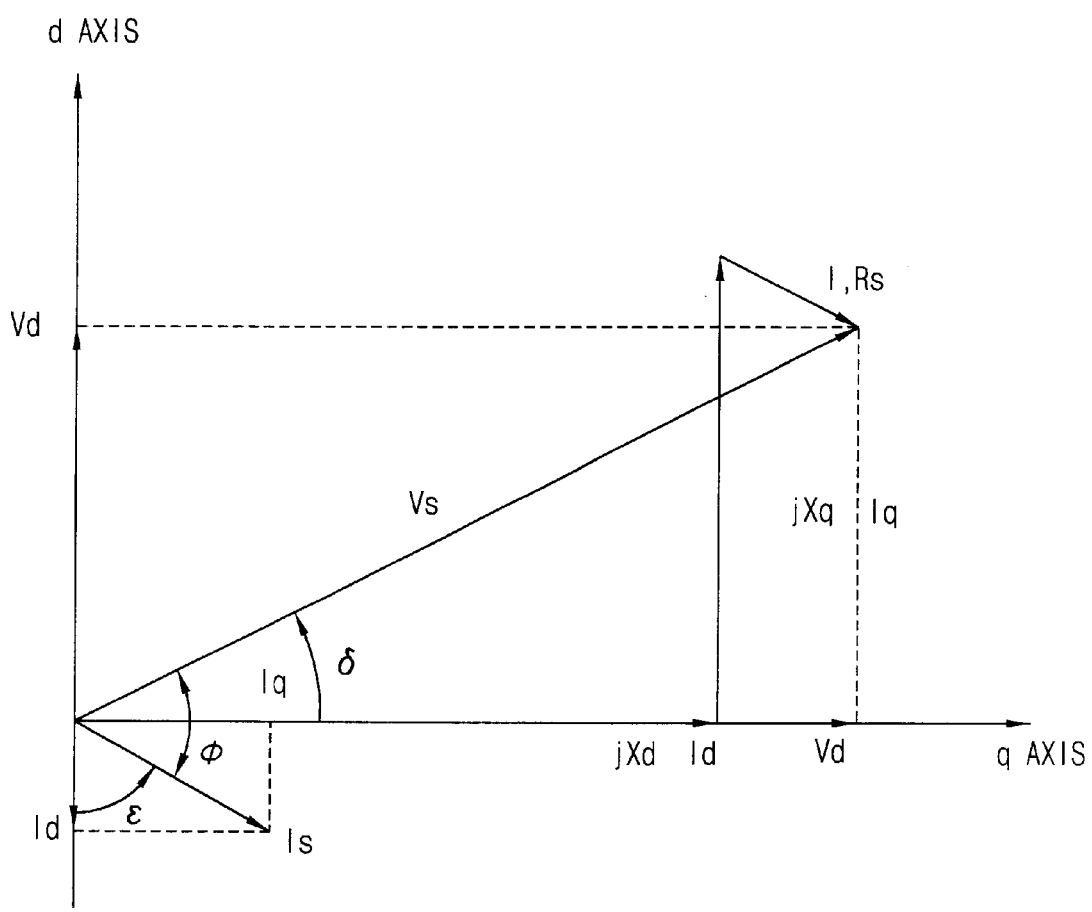
FIG. 3 is a vector diagram showing the voltage of the d axis of the SYNRM and the voltage of the q axis of the SYNRM in a steady state.
Figure 4:
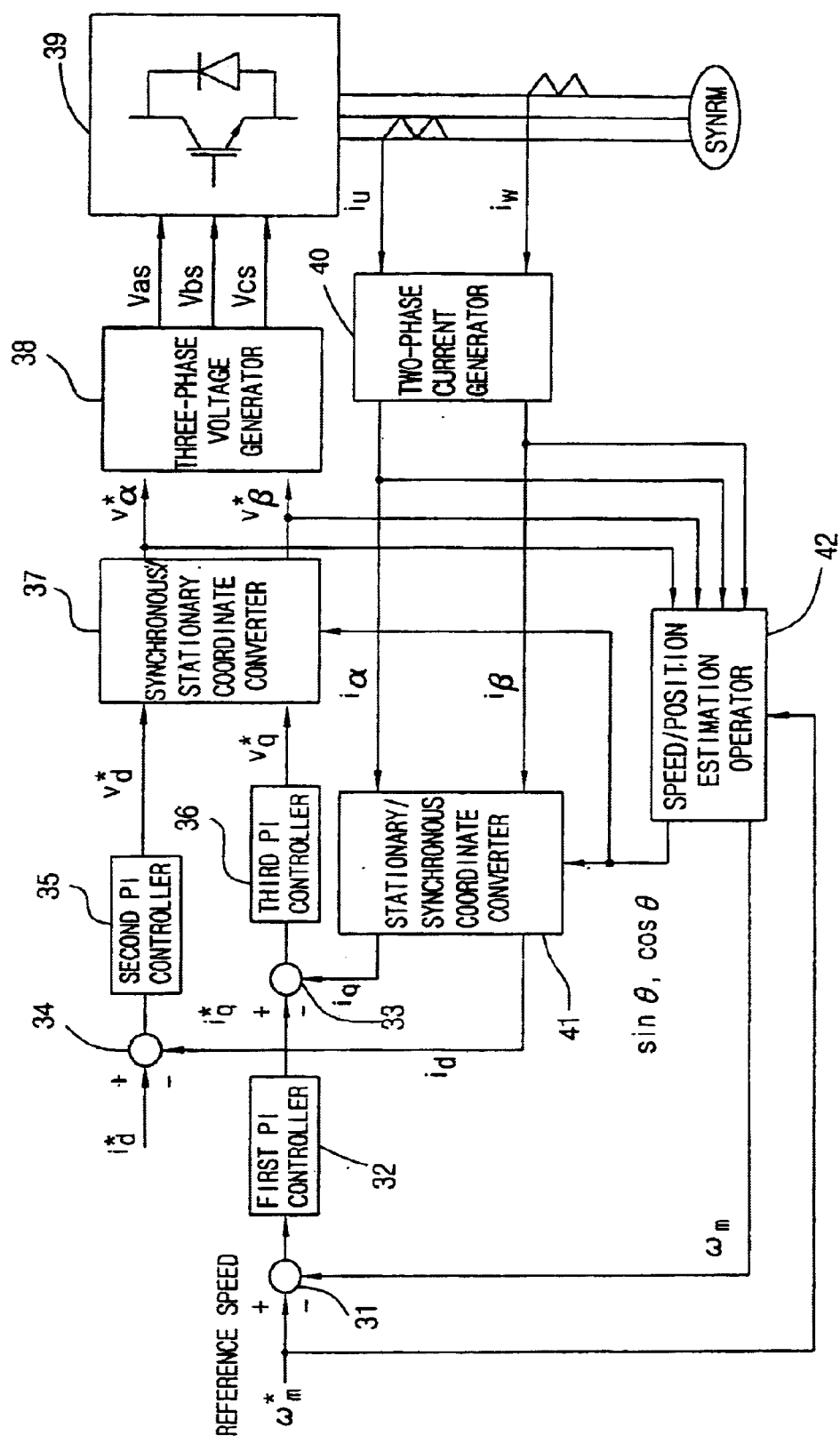
FIG. 4 is a block diagram showing the structure of an apparatus for controlling the rotation speed of a SYNRM according to the present invention.

Preferred embodiments of an apparatus for controlling the rotation speed of a motor, which is capable of precisely controlling the rotation speed of the motor by removing a hall sensor and an encoder for estimating the speed and the position of a motor, in particular, a synchronous reluctance motor (SYNRM), to thus detect the speed and the position of the SYNRM in a place where the position of a rotor cannot be easily detected, such as the compressors of a refrigerator and an air conditioner and extracting only the induced voltage of a fundamental wave component, to thus estimate and to operate the rotation speed of the SYNRM, will now be described in detail with reference to FIG. 4.

FIG. 4 is a block diagram showing the structure of an apparatus for controlling the rotation speed of a SYNRM according to the present invention.

As shown in FIG. 4, the apparatus for controlling the rotation speed of the SYNRM according to the present invention includes a first subtracter 31 for comparing the reference speed $w^*_m$ of the SYNRM with the estimated speed $w_m$ of the SYNRM and outputting an error value according to the comparison result, a first proportional integration (PI) controller 32 for receiving the error value obtained by comparing the estimated speed $w_m$ with the reference speed $w^*_m$ and outputting reference torque component current $i^*_q$ for compensating for the error value, a third subtracter 33 for comparing the reference torque component current $i^*_q$ with real torque component current $i_q$ and outputting an error value according to the comparison result, a third PI controller 36 for outputting the reference torque component voltage $v^*_q$ of the reference torque component current $i^*_q$ for compensating for the error value output from the third subtracter 33, a second subtracter 34 for comparing reference magnetic flux component current $i^*_d$ with real magnetic flux component current $i_d$ and outputting an error value according to the comparison result, a second PI controller 35 for outputting the reference magnetic-flux component voltage $v^*_d$ of the reference magnetic flux component current $i^*_d$ for compensating for the error value output from the second subtracter 34, a synchronous/stationary coordinate converter 37 for receiving the reference magnetic flux component voltage $v^*_d$ output from the second PI controller 35 and the reference torque component voltage $v^*_q$ output from the third PI controller 36 and outputting the α axis reference voltage $v^*_\alpha$ in a stationary coordinate system and a β axis reference voltage $v^*_\beta$ in the stationary coordinate system, a three phase voltage generator 38 for converting the α axis reference voltage $v^*_\alpha$ and the β axis reference voltage $v^*_\beta$ in the stationary coordinate system, which are output from the synchronous/stationary coordinate converter 37, into three phase voltages $v_{as}$, $v_{bs}$, and $v_{cs}$ and outputting the three phase voltages $v_{as}$, $v_{bs}$, and $v_{cs}$, an inverter 39 for applying the three phase voltages $v_{as}$, $v_{bs}$, and $v_{cs}$ generated by the three phase voltage generator 38 to the SYNRM, a two phase current generator 40 for converting the three phase current applied to the SYNRM into two phase current and outputting the two phase current, a speed/position estimation operator 42 for receiving the α axis reference voltage $v^*_\alpha$, the β axis reference voltage $v^*_\beta$, the two phase current, and the reference speed $w^*_m$, estimating the position and the speed of a rotor, and outputting the estimated speed $w_m$ of the SYNRM and sine and cosine values sin θ and cos θ of the magnetic flux angle θ of the rotor of the SYNRM, and a stationary/synchronous coordinate converter 41 for receiving the two phase current and the sine and cosine values sin θ and cos θ, converting the two phase current and the sine and cosine values sin θ and cos θ into a synchronous coordinate system and outputting the real torque component current $i_q$ and the real magnetic flux component current $i_d$. The operation of the apparatus for controlling the rotation speed of the SYNRM according to the present invention will now be described in detail.

The first subtracter 31 compares the estimated speed $w_m$ of the rotor of the SYNRM, which is output from the speed/position estimation operator 42 with the reference speed $w^*_m$ and outputs the error value according to the comparison result to the first PI controller 32. At this time, the estimated speed $w_m$ of the rotor is input to the inversion terminal (−) of the first subtracter 31. The reference speed $w^*_m$ is input to the non-inversion terminal (+) of the first subtracter 31.

The first PI controller 32 receives the error value output from the first subtracter 31, compensates for the error value, and outputs the reference torque component current $i^*_q$ to the third subtracter 33.

The third subtracter 33 compares the reference torque component current $i^*_q$ with the real torque component current $i_q$ output from the stationary/synchronous coordinate converter 41 and outputs the error value according to the comparison result to the third PI controller 36.

The third PI controller 36 outputs the reference torque component voltage $v^*_q$ with respect to the reference torque component current $i^*_q$ for compensating for the error value output from the third subtracter 33 to the synchronous/stationary coordinate converter 37.

The second subtracter 34 compares the reference magnetic flux component current $i^*_d$ with the real magnetic flux component current $i_d$ output from the stationary/synchronous coordinate converter 41 and outputs the error value according to the comparison result to the second PI controller 35.

The second PI controller 35 outputs the reference magnetic flux component voltage $v^*_d$ of the reference magnetic flux component current $i^*_d$ for compensating for the error value output from the second subtracter 34 to the synchronous/stationary coordinate converter 37.

The synchronous/stationary coordinate converter 37 receives the reference magnetic flux component voltage $v^*_d$ output from the second PI controller 35, the reference torque component voltage $v^*_q$ output from the third PI controller 36, and the sine and cosine values sin θ and cos θ output from the speed/position estimation operator 42 and outputs the α axis reference voltage $v^*_\alpha$ in the stationary coordinate system and the β axis reference voltage $v^*_\beta$ in the stationary coordinate system to the three phase voltage generator 38.

The three phase voltage generator 38 receives the α axis reference voltage $v^*_\alpha$ in the stationary coordinate system and the β axis reference voltage $v^*_\beta$0 in the stationary coordinate system, which are output from the synchronous/stationary coordinate converter 37, converts the α axis reference voltage $v^*_\alpha$ in the stationary coordinate system and the β axis reference voltage $v^*_\beta$ in the stationary coordinate system into the three phase voltages $v_{as}$, $v_{bs}$, and $v_{cs}$, and outputs the three phase voltages $v_{as}$, $v_{bs}$, and $v_{cs}$ to the inverter 39.

The inverter 39 receives the three phase voltages $v_{as}$, $v_{bs}$, and $v_{cs}$ generated by the three phase voltage generator 38 and applies the three phase voltages $v_{as}$, $v_{bs}$, and $v_{cs}$ to the SYNRM. At this time, the two phase current generator 40 converts the three phase current applied to the SYNRM into the two phase current, generates α axis current $i_\alpha$ in the stationary coordinate system and β axis current $i_\beta$ in the stationary coordinate system, and outputs the α axis current $i_\alpha$ in the stationary coordinate system and β axis current $i_\beta$ in the stationary coordinate system to the stationary/synchronous coordinated converter 41 and the speed/position estimation operator 42.

The speed/position estimation operator 42 receives the α axis reference voltage $v^*_\alpha$, the β axis reference voltage $v^*_\beta$, the α axis current $i_\alpha$, the β axis current $i_\beta$, and the reference speed $w^*_m$ and outputs the sine and cosine values $\sin\theta$ and $\cos\theta$ of the magnetic flux angle θ of the rotor of the SYNRM and the estimated speed $w_m$ of the rotor of the SYNRM.

An equation of magnetic flux interlinkages $\psi_\alpha$ and $\psi_\beta$ and the induced voltages $e_\alpha$ and $e_\beta$ in the α axis and the β axis, which are in the stationary coordinate system, and a current status equation in the SYNRM will now be described in detail with reference to Equations 4 and 5.

The equation 4 is the equation of the magnetic flux interlinkages $\psi_\alpha$ and $\psi_\beta$ and the induced voltages $e_\alpha$ and $e_\beta$ in the α axis and the β axis, which are in the stationary coordinate system.

$$\begin{bmatrix} \psi_\alpha \\ \psi_\beta \end{bmatrix} = L_q \begin{bmatrix} i_\alpha \\ i_\beta \end{bmatrix} + (L_d - L_q)i_d \begin{bmatrix} \cos\theta_e \\ \sin\theta_e \end{bmatrix} = \begin{bmatrix} L_q i_\alpha + \psi\cos\theta_e \\ L_q i_\beta + \psi\sin\theta_e \end{bmatrix} \quad \text{[Equation 4]}$$

$$e_\alpha = \frac{d}{dt}\psi_\alpha = -w_e\psi\sin\theta_e \text{ and } e_\beta = \frac{d}{dt}\psi_\beta = w_e\psi\cos\theta_e$$

wherein, ψ that is $(L_d - L_q)i_d$ refers to the magnetic flux interlinkage. $\psi_\alpha$ and $\psi_\beta$ refer to the magnetic flux interlinkages of the α axis and the β axis. $\theta_e$ refers to the electric angle of the magnetic flux.

The equation 5 is the current status equation in the SYNRM.

$$\frac{d}{dt}\begin{bmatrix} i_\alpha \\ i_\beta \end{bmatrix} = \begin{bmatrix} -\frac{R_s}{L_q} & 0 \\ 0 & -\frac{R_s}{L_q} \end{bmatrix}\begin{bmatrix} i_\alpha \\ i_\beta \end{bmatrix} - \frac{1}{L_q}\begin{bmatrix} e_\alpha \\ e_\beta \end{bmatrix} + \frac{1}{L_q}\begin{bmatrix} v_\alpha \\ v_\beta \end{bmatrix} \quad \text{[Equation 5]}$$

wherein, $v_\alpha$ and $v_\beta$ refer to the voltage of the α axis and the voltage of the β axis. $i_\alpha$ and $i_\beta$ refer to the current of the α axis and the current of the β axis. $L_q$ refers to the inductance of the q axis.

The induced voltages $e_\alpha$ and $e_\beta$ of the equation 4 are formed of the fundamental wave component, however, include a higher harmonics component and a direct current (DC) offset voltage as shown in Equation 6.

$$e_\alpha = \sum_{n=1}^{\infty}(a_n \cos w_n t + b_n \sin w_n t) + e_{\alpha dc} \quad \text{[Equation 6]}$$

wherein, $e_{\alpha dc}$ refers to the DC offset voltage of the induced voltage. That is, the current (the two phase current) detected when the SYNRM rotates includes the higher harmonics and the DC offset voltage. Accordingly, the higher harmonics and the DC offset voltage are included in the magnetic flux interlinkages $\psi_\alpha$ and $\psi_\beta$ of the α axis and the β axis. As a result, the higher harmonics and the DC offset voltage are included in the induced voltages $e_\alpha$ and $e_\beta$ of the α axis and the β axis.

Therefore, the speed/position estimation operator 42 reduces the ripple due to the higher harmonics and the DC offset voltage of the magnetic flux interlinkages $\psi_\alpha$ and $\psi_\beta$ of the α axis and the β axis and precisely controls the position and the speed of the SYNRM using only the induced voltage of the fundamental wave component. That is, only the induced voltage of the fundamental wave component is extracted by adding the current component to an equation for obtaining the induced voltage as shown in Equation 7.

$$e_\alpha = a_1 \cos w_1 t + b_1 \sin w_1 t + e_{\alpha d} = e_{\alpha 1} + e_{\alpha d} = -w_e\psi\sin\theta_e + e_{\alpha d} \quad \text{[Equation 7]}$$

wherein, $e_{\alpha d}$ is $$\sum_{n=2}^{\infty}(a_n \cos w_n t + b_n \cos w_n t) + e_{\alpha dc}$$

and refers to the DC component of the induced voltage. ψ, $e_{\alpha 1}$, $w_1$, and $\theta_e$ refer to the magnetic flux interlinkage, the induced voltage of the fundamental wave component, the angle speed, and the electric angle of the magnetic flux, respectively.

The user defined magnetic flux interlinkages $\psi'_\alpha$ and $\psi'_\beta$ for removing the higher harmonics and the DC offset voltage and the fundamental wave component of the induced voltage can be obtained using Equation 8.

$$\begin{bmatrix} \psi'_\alpha \\ \psi'_\beta \end{bmatrix} = \begin{bmatrix} \psi_\alpha - L_q i_\alpha \\ \psi_\beta - L_q i_\beta \end{bmatrix} = \begin{bmatrix} \psi\cos\theta_e \\ \psi\sin\theta_e \end{bmatrix} \quad \text{[Equation 8]}$$

$$\frac{d}{dt}\begin{bmatrix} \psi'_\alpha \\ \psi'_\beta \end{bmatrix} = \begin{bmatrix} -w_e\psi\sin\theta_e \\ w_e\psi\cos\theta_e \end{bmatrix} = \begin{bmatrix} e_{\alpha 1} \\ e_{\beta 1} \end{bmatrix}$$

$$\frac{d}{dt}\begin{bmatrix} e_{\alpha 1} \\ e_{\beta 1} \end{bmatrix} = \begin{bmatrix} -w_e^2 \psi'_\alpha \\ -w_e^2 \psi'_\beta \end{bmatrix}$$

wherein, $\psi'_\alpha$ and $\psi'_\beta$ refer to the user defined magnetic flux interlinkages. $i_d$, $L_q$, and $w_e$ refer to the current of the d axis, the inductance of the q axis, and electric angle speed. $e_{\alpha 1}$ and $e_{\beta 1}$ refer to the fundamental wave components of the induced voltage. Therefore, the equations of the voltages of the α axis and the β axis are defined from the equations 5 and 8.

$$\frac{d}{dt}\begin{bmatrix} i_\alpha \\ \psi'_\alpha \\ e_{\alpha 1} \\ e_{\alpha d} \end{bmatrix} = \begin{bmatrix} -\frac{R_s}{L_q} & 0 & -\frac{1}{L_q} & -\frac{1}{L_q} \\ 0 & 0 & 1 & 0 \\ 0 & -w_e^2 & 0 & 0 \\ 0 & 0 & 0 & 0 \end{bmatrix}\begin{bmatrix} i_\alpha \\ \psi'_\alpha \\ e_{\alpha 1} \\ e_{\alpha d} \end{bmatrix} + \begin{bmatrix} \frac{1}{L_q} \\ 0 \\ 0 \\ 0 \end{bmatrix}v_\alpha \quad \text{[Equation 9]}$$

$$\frac{d}{dt}\begin{bmatrix} i_\beta \\ \psi'_\beta \\ e_{\beta 1} \\ e_{\beta d} \end{bmatrix} = \begin{bmatrix} -\frac{R_s}{L_q} & 0 & -\frac{1}{L_q} & -\frac{1}{L_q} \\ 0 & 0 & 1 & 0 \\ 0 & -w_e^2 & 0 & 0 \\ 0 & 0 & 0 & 0 \end{bmatrix}\begin{bmatrix} i_\beta \\ \psi'_\beta \\ e_{\beta 1} \\ e_{\beta d} \end{bmatrix} + \begin{bmatrix} \frac{1}{L_q} \\ 0 \\ 0 \\ 0 \end{bmatrix}v_\beta$$

The speed/position estimation operator 42 outputs the estimated speed $w_m$ and the sine and cosine values $\sin\theta$ and $\cos\theta$ of the magnetic flux angle θ of the rotor of the SYNRM as shown in Equation 10 so as to control the speed and the position of the rotor of the SYNRM.

$$w_e = \frac{e_{\beta 1}\psi'_\alpha - e_{\alpha 1}\psi'_\beta}{\psi'^2_\alpha + \psi'^2_\beta}, \quad \sin\theta_e = \frac{\psi'_\beta}{\sqrt{\psi'^2_\alpha + \psi'^2_\beta}}, \quad \text{[Equation 10]}$$

$$\cos\theta_e = \frac{\psi'_\alpha}{\sqrt{\psi'^2_\alpha + \psi'^2_\beta}}$$

$$w_m = \frac{2}{P}w_e$$

wherein, $v_\alpha$, $v_\beta$, $i_\alpha$, and $i_\beta$ refer to the voltages and the currents of the α axis and the β axis. $\psi'_\alpha$ and $\psi'_\beta$ refer to the user defined magnetic flux interlinkages. $e_{\alpha 1}$ and $e_{\beta 1}$ refer to the fundamental wave components of the induced voltage. $e_{\alpha d}$ and $e_{\beta d}$ refer to the DC components of the induced voltage. $w_e$ and $w_m$ refer to electrical angle speed and mechanical angle speed, respectively. $R_s$ refers to stator side resistance. $L_q$ refers to the inductance of the q axis. P refers to the number of poles.

As mentioned above, according to the present invention, it is possible to solve difficulties in installing the encoder and the hall sensor of the rotor position detector because the SYNRM is controlled by estimating the speed and the position of the rotor like the compressors of the refrigerator and the air conditioner without using the hall sensor and the encoder for estimating the speed and the position of the SYNRM.

Also, according to the present invention, it is possible to precisely control the rotation speed and the torque of the motor by estimating the rotation speed of the motor by extracting the induced voltage of the fundamental wave component and reducing the ripple generated due to the higher harmonics component of the to current by operating the estimated rotation speed.

What is claimed is:

1. An apparatus for controlling rotation speed of a motor, comprising:

a synchronous/stationary coordinate converter for comparing a reference speed of the motor with an estimated speed of the motor and outputting a reference magnetic flux component current and reference torque component current for compensating for an error value according to the comparison result as a reference voltage of an α axis and a reference voltage of a β axis in a stationary coordinate system;

a two phase current generator for receiving three phase current detected when the motor rotates and outputting the current of the α axis and the current of the β axis; and a speed/position estimation operator for estimating the position and the rotation speed of a rotor in the motor and controlling the rotation speed and a torque of the motor on the basis of the reference voltage of the α axis, the reference voltage of the β axis, the current of the α axis, the current of the β axis, and a reference speed, wherein an induced voltage of a fundamental wave component from the current of the a axis and the current of the β axis is extracted.

2. The apparatus of claim 1, wherein the two-phase current generator converts the three-phase current applied to the motor into a two-phase current and outputs the current of the α axis and the current of the β axis in the stationary coordinate system.

3. The apparatus of claim 1, wherein the motor is a synchronous reluctance motor (SYNRM).

4. The apparatus of claim 1, wherein the speed/position estimation operator outputs the sine and cosine values sin θ and cos θ of the magnetic flux angle θ of the rotor of the motor and the estimated speed of the rotor of the motor.

5. The apparatus of claim 1, wherein the speed/position estimation operator extracts only an induced voltage of a fundamental wave component from the current of the α axis and the current of the β axis.

6. The apparatus of claim 5, wherein the speed/position estimation operator extracts only the induced voltage of the fundamental wave component using the equation, $e_\alpha = a_1 \cos w_1 t + b_1 \sin w_1 t + e_{\alpha 1} = e_{\alpha 1} + e_{\alpha d} = -w_e \psi \sin \theta_e + e_{\alpha d}$ and wherein, $e_{\alpha d}$ that is $$\sum_{n=2}^{\infty}(a_n \cos w_n t + b_n \cos w_n t) + e_{\alpha dc},$$

$\psi$, $e_{\alpha 1}$, $w_1$, and $\theta_e$ refer to the DC (Direct current) component of the induced voltage, a magnetic flux interlinkage, the induced voltage of the fundamental wave component, angle speed, and the electric angle of the magnetic flux, respectively.

7. The apparatus of claim 1, wherein the speed/position estimation operator is configured to reduce a ripple of the rotation speed of the motor.

8. The apparatus of claim 7, wherein the speed/position estimation operator is configured to reduce the ripple of the rotation speed of the motor, to thus extract the induced voltage of the fundamental wave component using the equation, $$\begin{bmatrix} \psi'_\alpha \\ \psi'_\beta \end{bmatrix} = \begin{bmatrix} \psi_\alpha - L_q i_\alpha \\ \psi_\beta - L_q i_\beta \end{bmatrix} = \begin{bmatrix} \psi\cos\theta_e \\ \psi\sin\theta_e \end{bmatrix}$$

$$\frac{d}{dt}\begin{bmatrix} \psi'_\alpha \\ \psi'_\beta \end{bmatrix} = \begin{bmatrix} -w_e\psi\sin\theta_e \\ w_e\psi\cos\theta_e \end{bmatrix} = \begin{bmatrix} e_{\alpha 1} \\ e_{\beta 1} \end{bmatrix}$$

$$\frac{d}{dt}\begin{bmatrix} e_{\alpha 1} \\ e_{\beta 1} \end{bmatrix} = \begin{bmatrix} -w_e^2 \psi'_\alpha \\ -w_e^2 \psi'_\beta \end{bmatrix}$$

and wherein, $\psi'_\alpha$ and $\psi'_\beta$, $i_q$, $i_d$, $L_q$, $w_e$, $e_{\alpha 1}$ and $e_{\beta 1}$ refer to the user defined magnetic flux interlinkages, the currents of the d axis and q axis, the inductance of the q axis, and electric angle speed, and the fundamental wave components of the induced voltage, respectively.

9. The apparatus of claim 1, wherein the speed/position estimation operator estimates the voltages of the α axis and the β axis in the stationary coordinate system using the equation, $$\frac{d}{dt}\begin{bmatrix} i_\alpha \\ \psi'_\alpha \\ e_{\alpha 1} \\ e_{\alpha d} \end{bmatrix} = \begin{bmatrix} -\frac{R_s}{L_q} & 0 & -\frac{1}{L_q} & -\frac{1}{L_q} \\ 0 & 0 & 1 & 0 \\ 0 & -w_e^2 & 0 & 0 \\ 0 & 0 & 0 & 0 \end{bmatrix}\begin{bmatrix} i_\alpha \\ \psi'_\alpha \\ e_{\alpha 1} \\ e_{\alpha d} \end{bmatrix} + \begin{bmatrix} \frac{1}{L_q} \\ 0 \\ 0 \\ 0 \end{bmatrix} v_\alpha$$

$$\frac{d}{dt}\begin{bmatrix} i_\beta \\ \psi'_\beta \\ e_{\beta 1} \\ e_{\beta d} \end{bmatrix} = \begin{bmatrix} -\frac{R_s}{L_q} & 0 & -\frac{1}{L_q} & -\frac{1}{L_q} \\ 0 & 0 & 1 & 0 \\ 0 & -w_e^2 & 0 & 0 \\ 0 & 0 & 0 & 0 \end{bmatrix}\begin{bmatrix} i_\beta \\ \psi'_\beta \\ e_{\beta 1} \\ e_{\beta d} \end{bmatrix} + \begin{bmatrix} \frac{1}{L_q} \\ 0 \\ 0 \\ 0 \end{bmatrix} v_\beta$$

and estimates the position and the rotation speed of the rotor by outputting the equation $$w_e = \frac{e_{\beta 1}\psi'_\alpha - e_{\alpha 1}\psi'_\beta}{\psi'^2_\alpha + \psi'^2_\beta}, \sin\theta_e = \frac{\psi'_\beta}{\sqrt{\psi'^2_\alpha + \psi'^2_\beta}}, \cos\theta_e = \frac{\psi'_\alpha}{\sqrt{\psi'^2_\alpha + \psi'^2_\beta}},$$

and $w_m = \frac{2}{P}w_e,$ and wherein $v_\alpha$ and $v_\beta$, $i_\alpha$ and $i_\beta$, $\psi'_\alpha$ and $\psi'_\beta$, $e_{\alpha 1}$ and $e_{\beta 1}$, $e_{\alpha d}$ and $e_{\beta d}$, $w_e$ and $w_m$, $R_s$, $L_q$, and P refer to the voltages of the α axis and the β axis, the currents of the α axis and the β axis, the user defined magnetic flux interlinkages, the fundamental wave components of the induced voltage, the DC components of the induced voltage, electrical angle speed and mechanical angle speed, stator side resistance, the inductance of the q axis, and the number of poles.

10. An apparatus for controlling the rotation speed of a motor, comprising:
   a first proportional integration (PI) controller for outputting reference torque component current for compensating for an error value obtained by comparing a reference speed of the motor with an estimated speed of the motor;
   a third PI controller for outputting a reference torque component voltage of the reference torque component current for compensating for the error value obtained by comparing the reference torque component current with real torque component current;
   a second PI controller for outputting a reference magnetic flux component voltage of reference magnetic flux component current for compensating for the error value obtained by comparing the reference magnetic flux component current with real magnetic flux component current;
   a synchronous/stationary coordinate converter for receiving the reference magnetic flux component voltage output from the second PI controller and the reference torque component voltage output from the third PI controller and outputting a reference voltage of the α axis in the stationary coordinate system and a reference voltage of the β axis in the stationary coordinate system;
   a three phase voltage generator for converting the reference voltage of the α axis in the stationary coordinate system and the reference voltage of the β axis in the stationary coordinate system output from the synchronous/stationary coordinate converter into three phase voltage;
   an inverter for applying the three phase voltage to the motor;
   a two phase current generator for converting the three phase current applied to the motor into two phase current;
   a speed/position estimation operator for outputting the estimated speed of the motor and the sine and cosine values sin θ and cos θ of the magnetic flux angle θ of a rotor of the motor on the basis of the reference voltage of the α axis, the reference voltage of the β axis, the two phase current, and the reference speed, wherein an induced voltage of a fundamental wave component from the current of the α axis and the current of the β axis is extracted; and
   a stationary/synchronous coordinate converter for receiving the two phase current and the sine and cosine values sin θ and cos θ, converting the two phase current and the sine and cosine values sin θ and cos θ into a stationary coordinate system, and outputting the real torque component current and the real magnetic flux component current.

11. The apparatus of claim 10, wherein the motor is a synchronous reluctance motor (SYNRM).

12. The apparatus of claim 10, wherein the speed/position estimation operator extracts only an induced voltage of a fundamental wave component using the equation, $e_\alpha = a_1 \cos w_1 t + b_1 \sin w_1 t + e_{\alpha d} = e_{\alpha 1} + e_{\alpha d} = -w_e \psi \sin \theta_e + e_{\alpha d}$ and wherein, $e_{\alpha d}$ that is $$\sum_{n=2}^{\infty}(a_n \cos w_n t + b_n \cos w_n t) + e_{\alpha dc},$$

ψ, $e_{\alpha 1}$, $w_1$, and $\theta_e$ refer to a DC component of an induced voltage, a magnetic flux interlinkage, the induced voltage of a fundamental wave component, a angle speed, and an electric angle of the magnetic flux, respectively.

13. The apparatus of claim 10, wherein the speed/position estimation operator removes the magnetic flux component for reducing a ripple of the rotation speed of the motor, to thus extract an induced voltage of a fundamental wave component using the equation, $$\begin{bmatrix} \psi'_\alpha \\ \psi'_\beta \end{bmatrix} = \begin{bmatrix} \psi_\alpha - L_q i_\alpha \\ \psi_\beta - L_q i_\beta \end{bmatrix} = \begin{bmatrix} \psi \cos\theta_e \\ \psi \sin\theta_e \end{bmatrix}$$

$$\frac{d}{dt}\begin{bmatrix} \psi'_\alpha \\ \psi'_\beta \end{bmatrix} = \begin{bmatrix} -w_e \psi \sin\theta_e \\ w_e \psi \cos\theta_e \end{bmatrix} = \begin{bmatrix} e_{\alpha 1} \\ e_{\beta 1} \end{bmatrix}$$

$$\frac{d}{dt}\begin{bmatrix} e_{\alpha 1} \\ e_{\beta 1} \end{bmatrix} = \begin{bmatrix} -w_e^2 \psi'_\alpha \\ -w_e^2 \psi'_\beta \end{bmatrix}$$

and wherein, $\psi'_\alpha$ and $\psi'_\beta$, $i_q$, $i_d$, $L_q$, $w_e$, $e_{\alpha 1}$ and $e_{\beta 1}$ refer to a user defined magnetic flux interlinkages, the current of the q axis, the current of the d axis, an inductance of the q axis, and an electric angle speed, and a fundamental wave components of the induced voltage, respectively.

14. The apparatus of claim 10, wherein the speed/position estimation operator estimates the voltages of the α axis and the β axis in the stationary coordinate system using the equation, $$\frac{d}{dt}\begin{bmatrix} i_\alpha \\ \psi'_\alpha \\ e_{\alpha 1} \\ e_{\alpha d} \end{bmatrix} = \begin{bmatrix} -\frac{R_s}{L_q} & 0 & -\frac{1}{L_q} & -\frac{1}{L_q} \\ 0 & 0 & 1 & 0 \\ 0 & -w_e^2 & 0 & 0 \\ 0 & 0 & 0 & 0 \end{bmatrix}\begin{bmatrix} i_\alpha \\ \psi'_\alpha \\ e_{\alpha 1} \\ e_{\alpha d} \end{bmatrix} + \begin{bmatrix} \frac{1}{L_q} \\ 0 \\ 0 \\ 0 \end{bmatrix} v_\alpha$$

$$\frac{d}{dt}\begin{bmatrix} i_\beta \\ \psi'_\beta \\ e_{\beta 1} \\ e_{\beta d} \end{bmatrix} = \begin{bmatrix} -\frac{R_s}{L_q} & 0 & -\frac{1}{L_q} & -\frac{1}{L_q} \\ 0 & 0 & 1 & 0 \\ 0 & -w_e^2 & 0 & 0 \\ 0 & 0 & 0 & 0 \end{bmatrix}\begin{bmatrix} i_\beta \\ \psi'_\beta \\ e_{\beta 1} \\ e_{\beta d} \end{bmatrix} + \begin{bmatrix} \frac{1}{L_q} \\ 0 \\ 0 \\ 0 \end{bmatrix} v_\beta$$

and estimates the position and the rotation speed of the rotor by outputting the equation $$w_e = \frac{e_{\beta 1}\psi'_\alpha - e_{\alpha 1}\psi'_\beta}{\psi'^2_\alpha + \psi'^2_\beta}, \sin\theta_e = \frac{\psi'_\beta}{\sqrt{\psi'^2_\alpha + \psi'^2_\beta}}, \cos\theta_e = \frac{\psi'_\alpha}{\sqrt{\psi'^2_\alpha + \psi'^2_\beta}},$$

$$\text{and } w_m = \frac{2}{P}w_e,$$

and wherein $v_\alpha$ and $v_\beta$, $i_{60}$ and $i_\beta$, $\psi'_\alpha$ and $\psi'_\beta$, $e_{\alpha 1}$ and $e_{\beta 1}$, $e_{\alpha d}$ and $e_{\beta d}$, $w_e$ and $w_m$, $R_s$, $L_q$, and P refer to the voltages of the α axis and the β axis, the currents of the α axis and the β axis, a user defined magnetic flux interlinkages, a fundamental wave components of the induced voltage, the DC components of the induced voltage, an electrical angle speed and a mechanical angle speed, a stator side resistance, an inductance of the q axis, and a number of poles.

15. An apparatus for controlling rotation speed of a motor, comprising:

a first subtracter for comparing a reference speed of the motor with an estimated speed of the motor and outputting an error value according to the comparison result;

a first PI controller for outputting reference torque component current for compensating for the error value;

a third subtracter for comparing the reference torque component current with real torque component current and outputting an error value according to the comparison result;

a third PI controller for outputting a reference torque component voltage of the reference torque component current for compensating for the error value output from the third subtracter;

a second subtracter for comparing reference magnetic flux component current with real magnetic flux component current and outputting an error value according to the comparison result;

a second PI controller for outputting a reference magnetic flux component voltage of the reference magnetic flux component current for compensating for the error value output from the second subtracter;

a synchronous/stationary coordinate converter for receiving the reference magnetic flux component voltage output from the second PI controller and the reference torque component voltage output from the third PI controller and outputting a reference voltage of the $\alpha$ axis in the stationary coordinate system and a reference voltage of the $\beta$ axis in the stationary coordinate system;

a three phase voltage generator for converting the reference voltage of the $\alpha$ axis in the stationary coordinate system and the reference voltage of the $\beta$ axis in the stationary coordinate system output from the synchronous/stationary coordinate converter into a three phase voltage and outputting the three phase voltage;

an inverter for applying the three phase voltage generated by the three phase voltage generator to the motor;

a two phase current generator for converting the three phase current applied to the motor into two phase current and outputting the two phase current;

a speed/position estimation operator for receiving the reference voltage of the $\alpha$ axis, the reference voltage of the $\beta$ axis, the two phase current, and the reference speed, wherein an induced voltage of a fundamental wave component from the current of the $\alpha$ axis and the current of the $\beta$ axis is extracted, estimating a position and the speed of the motor, and outputting the estimated speed of the motor and a sine and cosine values of a magnetic flux angle of a rotor of the motor; and a stationary/synchronous coordinate converter for receiving the two phase current and the sine and cosine values, converting the two phase current and the sine and cosine values into a synchronous coordinate system, and outputting the real torque component current and the real magnetic flux component current.

16. The apparatus of claim 15, wherein the motor is the SYNRM.

17. The apparatus of claim 15, wherein the speed/position estimation operator extracts only an induced voltage of a fundamental wave component from the current of the $\alpha$ axis and the current of the $\beta$ axis.

18. The apparatus of claim 1, wherein the speed/position estimation operator estimates position and rotation speed of the rotor and controls rotation speed and torque of the motor without the use of sensors to directly measure rotation speed and flux.

19. The apparatus of claim 7, wherein the speed/position estimation operator generates a computationally derived value for magnetic flux angle.

20. The apparatus of claim 8, wherein the speed/position estimation operator generates a computationally derived value for magnetic flux angle.

21. The apparatus of claim 10, wherein the speed/position estimation operator estimates position and rotation speed of the rotor and controls rotation speed and torque of the motor without the use of sensors to directly measure rotation speed and flux.

22. The apparatus of claim 15, wherein the speed/position estimation operator estimates position and rotation speed of the rotor and controls rotation speed and torque of the motor without the use of sensors to directly measure rotation speed and flux.

* * * * *